Patented June 7, 1927.

1,631,723

UNITED STATES PATENT OFFICE.

ERWIN O. FREUND, OF CHICAGO, ILLINOIS, ASSIGNOR TO THE VISKING CORPORATION, OF CHICAGO, ILLINOIS, A CORPORATION OF VIRGINIA.

METHOD OF PREPARING WIENER SAUSAGES.

No Drawing.   Application filed August 19, 1926. Serial No. 130,363.

This invention relates particularly to the preparation of sausages of the kind commonly known as wieners, and the primary object of the invention is to provide an improved product and a simple method of preparing the same.

Sausages of the kind usually known as wieners ordinarily are prepared principally from beef meat. The meat is ground and suitably seasoned, or spiced; also, the meat commonly has mixed therewith a cereal meal, or flour, such as a corn meal, or flour, adapted to give a certain consistency and render the product more palatable and more desirable as a food.

It is common practice to grind ice in with the meat for the purpose of chilling it, before the stuffing operation is performed. In accordance with the present process, the meat, after being properly prepared, is stuffed into an artificial casing, preferably a cellulose casing. A casing particularly well adapted to the present purpose is described in an application of William F. Henderson and Harold E. Dietrich, Serial No. 101,958, filed in the United States Patent Office April 14, 1926, such casing being formed by extruding viscose into tubular form and coagulating the viscose; purifying the casing; introducing into the casing a small percentage of a hygroscopic agent, such as glycerin; and drying the casing.

The dried casing may be gathered onto, or shirred upon a suitable mandrel, or mounting-tube, and may be applied to the extruding horn of a sausage machine and filled in the same manner as natural casings.

In accordance with the present process, the cellulose casing is filled with the "meat" which contains water and which is in a semi-fluid condition. After stuffing, the sausage may be sprinkled with water to facilitate sliding on the stuffing table and also to facilitate linking. Linking is accomplished in the usual manner by twisting the casing at suitable intervals. After linking, the sausage is subjected to a curing operation, by smoking. The common practice is to subject the sausage to the action of smoke at a temperature of about 165° F., usually for a period of from one to four hours. This practice is suitable in the present process.

After the smoking operation has been performed, the sausages are cooked, or partially cooked, either in vats of boiling water, or water near the boiling point; or the cooking may be performed in a special room where the sausages are subjected to the cooking action of wet steam. The cooking may be more or less thorough, as desired, one of the purposes being to thoroughly sterilize the sausages. Another object is to render the product more tender.

In the operation of curing the sausage by smoking, the sausage meat changes from a semi-fluid condition to a solid and rather tenacious condition; also, the smoking operation coagulates proteins in the sausage, especially at the surface of the sausage, thereby producing a tenacious skin-portion. In the subsequent cooking operation, the tenacious skin formed on the meat itself is not destroyed. In fact, there may be to a certain extent a further agglutination of the particles of which the sausage is composed. The cooking operation results in the interposition of a film of water between the cellulose casing and the sausage in the casing. This renders it possible, after the cooking operation, to strip the casing from the sausage by drawing the casing back over itself; or, if desired, the casing may be slitted and readily peeled from the sausage although ordinarily the skinning operation may be performed by simply drawing the casing back over itself as a glove may be taken from the hand.

Artificial sausage casings of the character mentioned possess an exceedingly fine texture and produce a very fine smooth surface on the meat forming the sausage. It has been found that the casing may be removed from the sausage at the stage after the cooking operation, and that the sausage will then possess a fine smooth surface, and may be handled and treated in all respects like a sausage contained in a casing. That is, the stripped sausage will hold its shape, will stand handling without breaking, and can be cooked, fried, or grilled without falling apart.

To facilitate the skinning of the sausages, the sections are cut apart at the linkages, or twisted portions of the casing; the twisted end-portions of the links are untwisted, leaving an open end which may readily be turned back over itself, and the casing is removed by a stripping operation in an obvious manner.

It is preferred to cool the sausage, either by chilling or by allowing to stand until near room temperature, before peeling the sausage. In the cooking operation, the water which becomes interposed between the casing and body of sausage produces a clean line of cleavage. During the subsequent cooling of the sausage, this interposed film of water may largely or even wholly disappear, but nevertheless the skinning operation may be performed readily, leaving a perfectly clean, smooth outer surface on the sausage, which is highly important in the product.

If desired, the stripped sausage may be placed in a can, the can may be sealed, and the sausages may be cooked in a pressure cooker. Such cooking is usually performed at about 240° F. for a period of one hour. It has been found that the stripped sausages may be cooked in this manner without disintegration and without change of form.

The cellulose casing lends itself to the process described, partly because of the very fine texture and smoothness of the cellulose film, and partly because of a certain freedom from adherence between the meat and cellulose casing. Taken at the stage where water is present between the meat and the casing and after the meat has been compacted, the proteins at the surface, particularly, coagulated and the particles of meat agglutinated, the skinning operation is readily performed and a flawless product is readily produced. The use of glycerin in the cellulose casing tends to prevent cracking of the casing and tends to preserve the tenacious quality of the casing, so that the skinning of the casing from the sausage is thus facilitated. However, it is not believed that the glycerin is present in sufficient quantity to enter, to any material extent, into the formation of the protein skin on the surface of the meat during the purifying operation effected by smoking.

The improved sausage possesses the advantage that it is free from the artificial casing, which, while edible, may be objectionable to some people; also, the sausage is rendered more tender by reason of the absence of the casing. Moreover, the sausage is free from suggestion of taint, sometimes associated with the use of natural casings. The sausage resulting from the improved process is of inviting appearance, which is a further advantage in this class of product.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The process of preparing a sausage which comprises: stuffing the prepared meat into an artificial casing, thereby forming a sausage; subjecting the sausage to a curing operation; subjecting the cured sausage to a cooking operation; and stripping the casing from the sausage.

2. The process of preparing a sausage which comprises: stuffing the prepared meat into a cellulose casing to form a sausage; subjecting the sausage to a curing operation by smoking the sausage; subjecting the cured sausage to heat in a wet atmosphere; cooling the sausage; and stripping the casing from the sausage.

3. The process of preparing a sausage which comprises: introducing sausage meat in semi-fluid condition into a cellulose casing; converting the meat into solid condition by a curing operation; subjecting the sausage to heat in a moist atmosphere; and stripping the casing from the sausage while in moist condition.

4. The process of preparing a sausage which comprises: stuffing with sausage meat a cellulose casing and linking the casing at intervals; curing the sausage by a smoking operation and thereby solidifying the meat within the casing and producing a tenacious skin at the surface of the meat; subjecting the sausage to a cooking operation in moist atmosphere; severing the sausage at the linking points; and skinning the casing-sections from the severed links.

ERWIN O. FREUND